United States Patent [19]

Dickerson et al.

[11] Patent Number: 4,988,168
[45] Date of Patent: Jan. 29, 1991

[54] TFT LCD DEVICE HAVING COLOR FILTER LAYER DECAL

[75] Inventors: Jack A. Dickerson; James C. Greeson, Jr.; Neil M. Poley, all of Raleigh, N.C.

[73] Assignee: International Business Machines Corporation, Armonk, N.Y.

[21] Appl. No.: 66,387

[22] Filed: Jun. 25, 1987

[51] Int. Cl.$^5$ ............................................. G02F 1/13
[52] U.S. Cl. ........................ 350/339 F; 350/334; 350/311
[58] Field of Search .................. 350/339 F, 334, 311

[56] References Cited

U.S. PATENT DOCUMENTS

| 4,410,887 | 10/1983 | Stolov et al. | 350/339 F |
| 4,597,637 | 6/1986 | Ohta | 350/339 F |
| 4,600,833 | 7/1986 | Shibata et al. | 350/311 |
| 4,714,636 | 12/1987 | Yokono et al. | 350/339 F |
| 4,743,099 | 5/1988 | Dickerson et al. | 350/339 F |

FOREIGN PATENT DOCUMENTS 0120321 6/1985 Japan ............................... 350/339 F Primary Examiner—Stanley D. Miller
Assistant Examiner—Huy K. Mai
Attorney, Agent, or Firm—Gerald R. Woods

[57] ABSTRACT

Decal technology is employed to provide a color filter layer for a thin film transistor liquid crystal display device. The red/green/blue color regions and an opaque surround are printed on a suitable substrate using gravure printing techniques and colored glass frit materials. Once the printed decal is transferred to one of the glass panels, it can be heated to fuse it to the glass. Electrodes can be deposited directly on this fused color filter layer.

9 Claims, 4 Drawing Sheets

TFT LCD DEVICE HAVING COLOR FILTER LAYER DECAL

FIELD OF THE INVENTION

The present invention relates to liquid crystal displays and more particularly to a method of making a liquid crystal display with decal technology to provide color filters.

DESCRIPTION OF THE PRIOR ART

Thin film transistor liquid crystal (TFT LC) display technology is being developed as a possible successor to cathode ray tube technology for color display terminals. Liquid crystal displays with a given display screen area occupy a smaller volume than cathode ray tube devices with the same screen area. This is considered significant commercially, since the smaller liquid crystal display has a smaller footprint; that is, occupies less area on a user's desk or terminal stand. Liquid crystal display devices may have lower power requirements than corresponding cathode ray tube devices. The operating voltages of liquid crystal devices are considerably lower than the operating voltages of cathode ray tube devices.

While different types of color liquid crystal display devices exist, such devices generally include two spaced glass panels which define a sealed cavity filled with a liquid crystal material. A transparent common electrode is formed on one of the glass panels. Individual electrodes are formed on the other of the glass panels. Each of the individual electrodes has a surface area corresponding to the area of one picture element or pel. Each pel is too small to be easily seen by the unaided human eye. If the device is to have color capabilities, it must also include color filters with red, green and blue color areas. Each color area is aligned with one of the pel-sized electrodes. Each set of red, green and blue color areas is grouped into a triad or other consistent pattern, such as repetitive stripes.

In the type of device contemplated by the present invention, each of the individual electrodes can be addressed by means of a thin film transistor. Depending upon the image to be displayed, one or more of the pel electrodes is energized during display operation to allow full light, no light or partial light to be transmitted through the color filter area associated with that pel electrode. The image perceived by a user is a blending of colors formed by the transmission of light through adjacent color filter areas.

The display may be backlighted by locating a light source on the opposite side of the display from the viewer. Alternatively, the display device may include a reflective layer at its rear surface and rely on a light source located on the same side of the display as the viewer.

Color filters for use on such devices have been fabricated using a number of different approaches. One approach has been to spin or deposit a light sensitized adhesive film onto the glass panel. The film is then patterned in three sequential steps. During each step, dye of a specific color is applied to predetermined regions of the film. According to another approach, organic pigments are deposited by vacuum evaporation. The filters are patterned using conventional photolithographic lift-off techniques. According to still another approach, a dyed and patterned stretched film material is used to create an internal color polarizing filter.

Each of these approaches has certain drawbacks. Most involve wet processing and photopatterning techniques which are relatively costly and difficult to perform with the necessary precision. Also, each creates a color filter film which is located between the transparent common electrode and the individually-addressable pel electrodes. To increase the optical density (or color intensity) of color filters made by the above-described approaches, the thickness of the film may be increased. However, increasing the film thickness also increases the spacing between the transparent common electrode and the individually-addressable pel electrodes. As a consequence, the operating voltage of the device must be increased to offset the greater voltage drop through the liquid crystal layer.

One of the major problems with the approaches described above is the difficulty of maintaining registration or alignment between the pel electrodes and the color regions in the color filter layer. Many of the processes require multiple dyeing or deposition operations. Misalignment or improper deposition of color materials may occur during any of these operations. While it is possible to maintain precise alignment or registration in a laboratory environment on a low volume basis, it becomes much more difficult to do so in a high volume, production environment.

Still another approach uses photosensitive emulsion layers. A liquid crystal shutter device is used to sequentially expose predetermined areas of the photosensitive emulsions layers while the layers are flooded with light having the specific color. Three differently colored regions are formed by sequentially energizing three different groups of pel electrodes through associated thin film transistors. The latent images produced in the photosensitive emulsion layer are developed and the film is laminated to a glass substrate to form a multi-colored filter.

While this approach simplifies registration or alignment problems, it nevertheless retains the drawbacks of some of the other approaches discussed earlier. Multiple exposure operations to different colors of light are required along, apparently, with a step of laminating photosensitive emulsions to a glass substrate. The number of steps and the relative complexity of those steps necessarily must be reflected in the product cost.

SUMMARY OF THE INVENTION

The present invention is a thin film transistor liquid crystal display with color capabilities. Decal technology is employed in the fabrication of the display to simplify the task of aligning pel electrodes with associated color regions in the color filter layer.

The invention is an improvement in a liquid crystal display device of the type having spaced front and rear glass panels, a transparent electrode layer and an array of individually addressable pel electrodes separated from the transparent electrode layer by a cavity filled with liquid crystal material. The improvement comprises a color filter layer in the form of a decal. The decal is placed on one of the glass panels using known decal transfer methods.

Because decals can be produced to high resolutions using known gravure or related printing techniques, less difficulty is expected in achieving registration between the color regions in the color filter decal and the pel electrodes. A particular advantage of a color filter decal is the ability to produce red/blue/green regions having any desired hue and intensity.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

TECHNICAL DESCRIPTION

Figure 1:
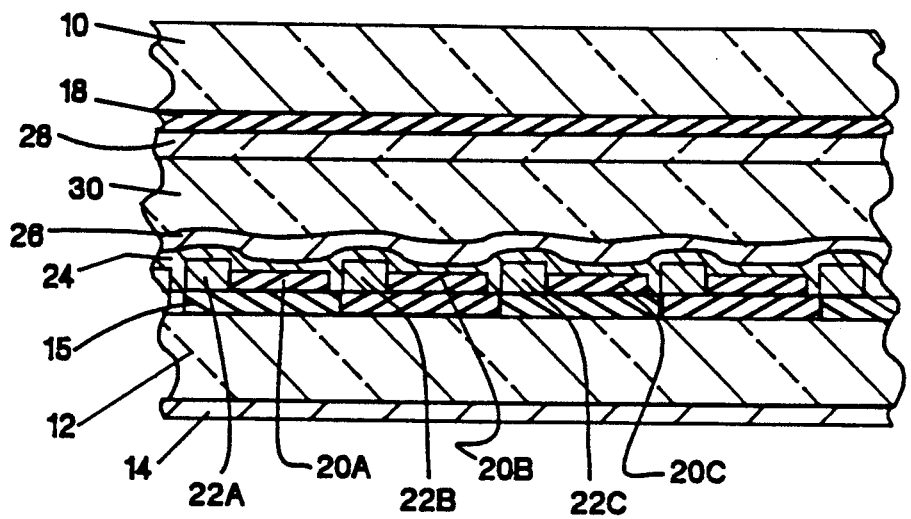
FIG. 1 is a partial cross section of a preferred embodiment of a thin film transistor liquid crystal display device made in accordance with the present invention.

FIG. 1 is a partial cross section of a thin film transistor liquid crystal display which can be fabricated in accordance with the present invention. The display includes a transparent front glass panel 10, a transparent rear glass panel 12, a polarizing filter 14, a color filter layer 15, a transparent common electrode 18 and a plurality of individually-addressable pel electrodes 20A, 20B, 20C, etc. The pel electrodes may be individually addressed or energized through associated thin film transistors 22A, 22B, 22C, etc. The pel electrodes and thin film transistors are deposited directly on the color filter layer 15, details of which are provided below, and are covered by a layer 24 of insulating material. The layer 24 is, in turn, covered by an alignment film 26. A second alignment film 28 is deposited on the transparent common electrode 18. The space between the alignment films 26 and 28 is a cavity 30 which can be filled with a liquid crystal material.

Most of the components described above are conventional and are fabricated using conventional known techniques. The color filter layer is different, however, in that it is made and transferred to the rear glass panel 12 using decal technology.

Generally speaking, a decal is a design that is printed on a specially prepared substrate, usually paper, to form a film that can be transferred to another surface. The film itself is usually called the decal (or transfer). Different types of decal technology exist. According to one known decal technology, the substrate is coated with a material having low adhesive properties. The design to be transferred is printed on this coating and is covered with a coating of water-soluble glue, commonly referred to as a stickative. When the decal is moistened, the printed design is applied to a surface and the backing substrate is removed. The design and glue are allowed to dry to permanently affix the decal to the surface.

An alternative, but also well known, decal technology uses a stickative which is activated by heat. Once the design is transferred to the surface on which it is to remain, heat is applied to activate the stickative.

The actual decal to be used in accordance with the present invention would take the form of red, green and blue color regions separated by an opaque surround. In a preferred embodiment, the red, green and blue areas, are formed by using gravure printing techniques to deposit red, green and blue glass frit material in the color regions and an opaque glass frit material in the surround regions. Since the color filter region is adjacent the thin film transistors in the embodiment illustrated in FIG. 1, screen printing techniques could be used to deposit conductive paths on the surround to provide control leads from the thin film transistors to external driver electronics.

Figure 2:
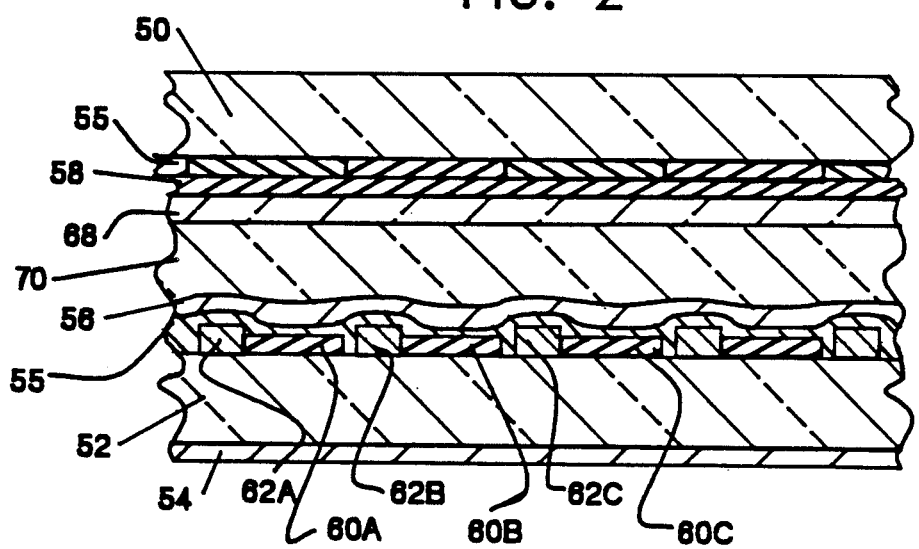
FIG. 2 is a partial cross section of an alternative embodiment of a thin film transistor liquid crystal display device made in accordance with the present invention.

An alternative embodiment of thin film transistor liquid crystal display is shown in FIG. 2. The alternative embodiment includes basically the same components as the embodiment shown in FIG. 1, but the color filter layer is located in a different place. More specifically, the device shown in FIG. 2 has a transparent front glass panel 50, a transparent rear glass panel 52, a polarizing filter 54, a transparent common electrode layer 58 and an array of individually-addressable pel electrodes 60A, 60B, 60C, etc., with associated thin film transistors 62A, 62B, 62C, etc. The pel electrodes and thin film transistors are coated with a layer 55 of insulating material. An alignment film 56 covers the insulating layer 55. A second alignment film 68 is deposited on the common electrode layer 58. The alignment films define the cavity 70 which will contain the liquid crystal material.

In the embodiment shown in FIG. 2 a color filter layer 55, made using decal technology, is applied to the front glass panel 50 beneath the common electrode layer 58. As mentioned earlier, glass frit material may be used in printing the decal, allowing the decal to be thermally fused to the glass panel. Alternatively, the decal may be formed using colored inks. If that is the case, the relative positions of the color filter layer 55 and the common electrode layer 58 would probably be reversed since deposit of the common electrode layer requires the use of heat levels which might degrade a non-glass decal material.

Figure 3:
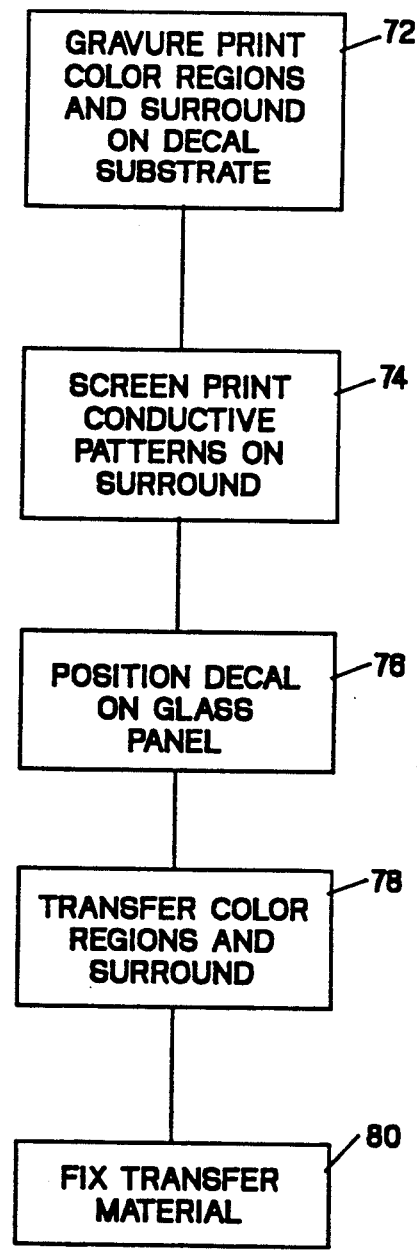
FIG. 3 is a block diagram of steps performed in forming the color filter layer for the disclosed devices.

FIG. 3 is a simplified flow chart of steps that are performed in employing decal technology in thin film transistor liquid crystal display devices. The color regions and the surround are gravure printed (operation 72) on a suitable decal substrate. Preferably, glass frit material is used. Screen printing techniques are then used (operation 74) to print conductive patterns on the surround.

The finished decal is eventually transferred to one of the glass panels in the partially fabricated display device by first positioning it relative to guide marks on the glass panel (operation 76) and by then carrying out the transfer (operation 78) using the transfer technique appropriate for the decal technology actually employed. The decal is permanently fixed in position using the fixing technique (operation 80) suitable for the technology. These steps are independent of the form of liquid crystal device.

Figure 4:
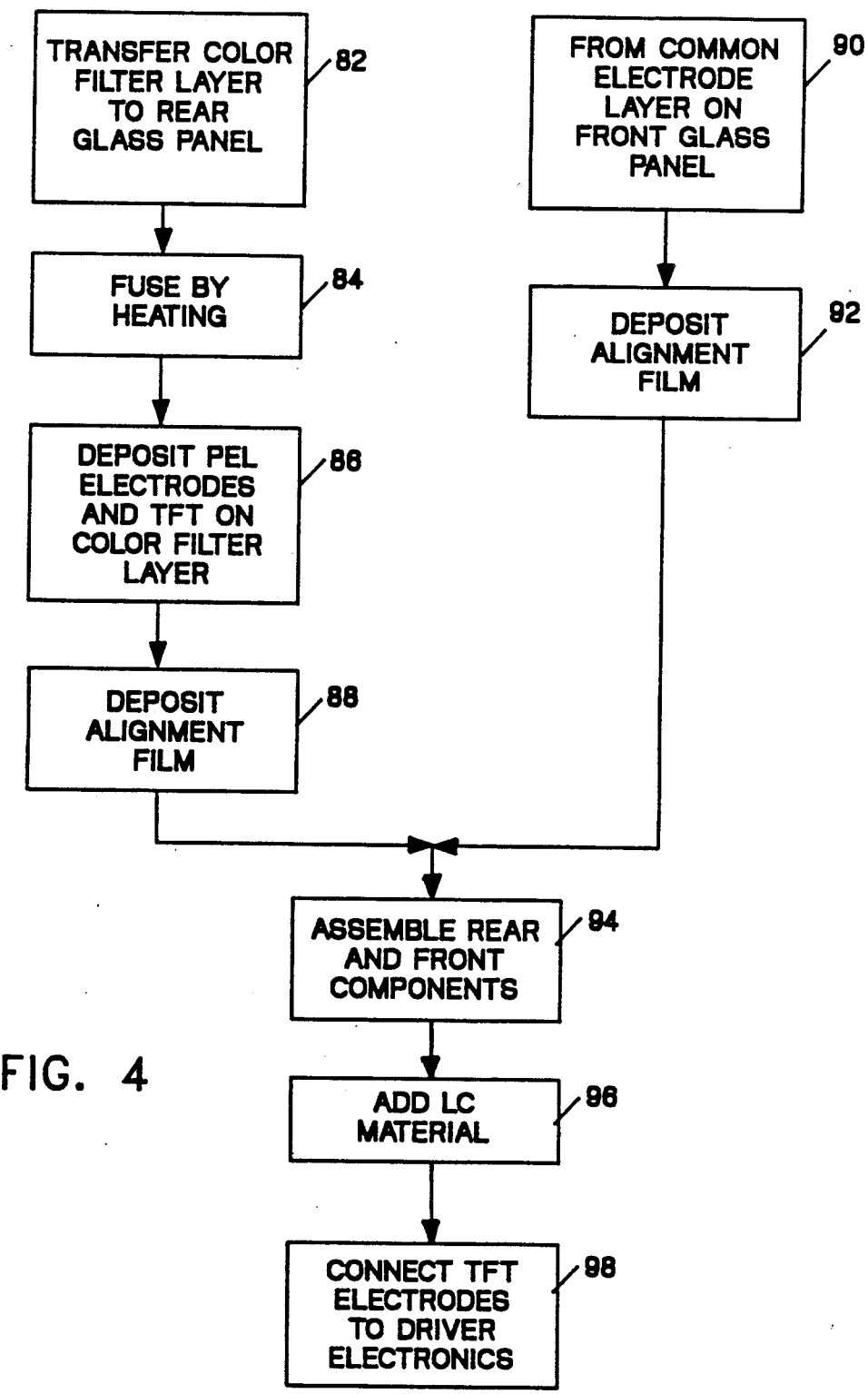
FIG. 4 is a block diagram of specific steps required in producing the device shown in FIG. 1.

FIG. 4 generally illustrates specific operations that must be carried out in fabricating the device shown in FIG. 1. Referring to FIG. 4, separate and independent operations are to form the subassemblies associated with the front and rear glass panels. In forming the rear glass panel subassembly, a previous formed color filter decal is transferred (operation 82) to the rear glass panel and is permanently fixed in place by a heating or fusing step (operation 84).

Once the color filter decal is permanently fixed, the pel electrodes and thin film transistors can be deposited (operation 86) directly on the color filter layer. The alignment film is deposited (operation 88) to complete the rear glass panel subassembly.

The front glass panel subassembly is fabricated in parallel with the rear glass panel subassembly. The common electrode layer for the display device is formed on the front glass panel in an operation 90 and is covered by the alignment film in an operation 92 to complete the front glass panel subassembly. The front and rear subassemblies are assembled in an operation 94, liquid crystal material is added in an operation 96 in the cavity between the two subassemblies and leads to the thin film transistors, preferably formed directly by screen printing conductive paths on the color filter decal, are connected to driver electronics in an operation 98.

Most of the steps described above are conventional in nature and therefore need not be described in detail.

Figure 5:
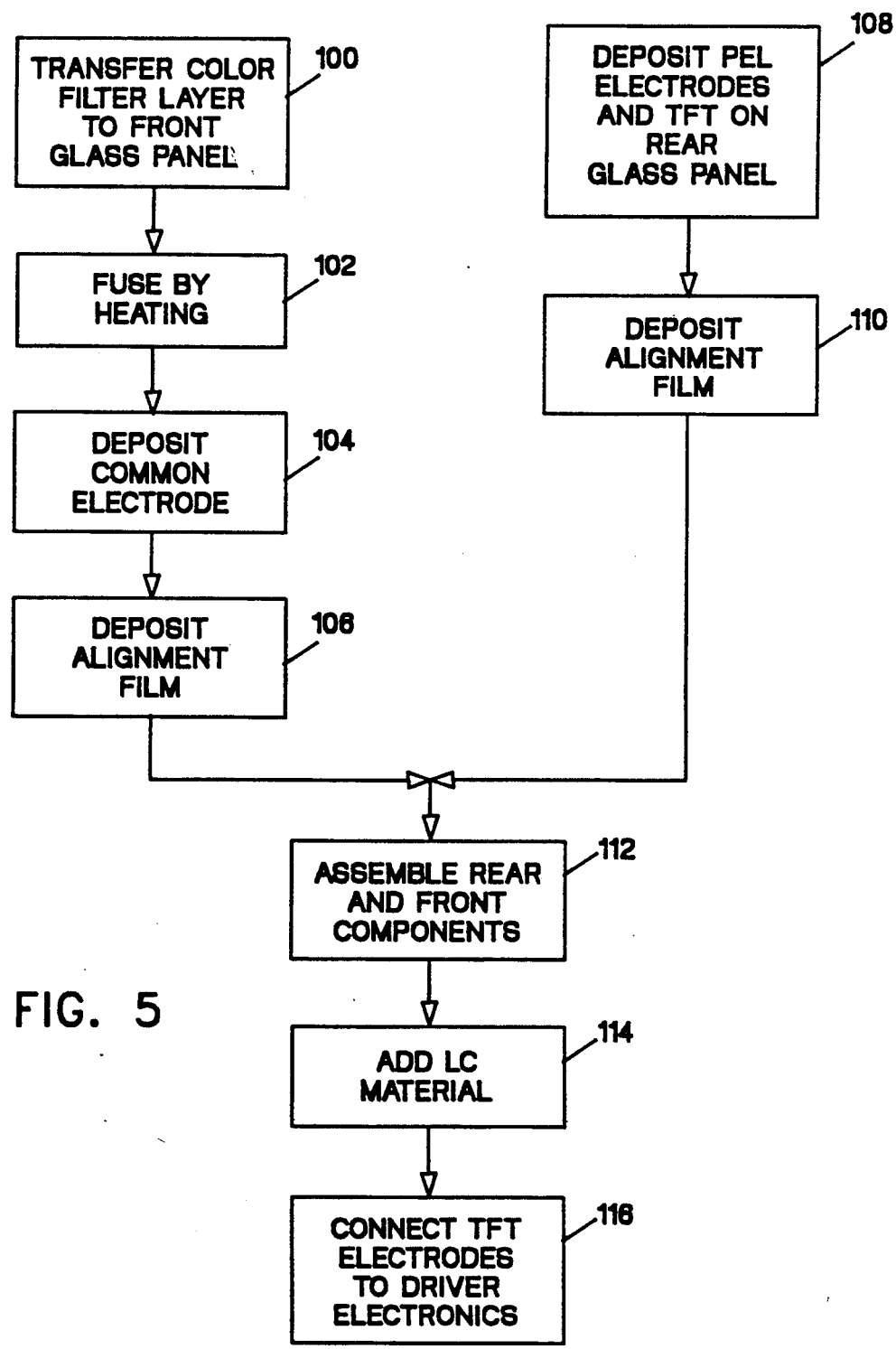
FIG. 5 is a block diagram of specific steps required in producing the device shown in FIG. 2.

The alternative embodiment of display device illustrated in FIG. 2 is fabricated using the specific steps shown in the block diagram of FIG. 5. In fabricating the front glass panel subassembly for the alternative embodiment, the color filter decal is transferred to the front glass panel in an operation 100, the exact nature of which depends upon the type of decal technology employed. Assuming the color filter decal is made of glass frit materials, the decal layer can be fused to the front glass panel by heating in an operation 102. The transparent common electrode for the display device is deposited (operation 104) directly upon the color filter decal layer before an alignment film is formed (operation 106) on the common electrode.

For the alternative embodiment, the rear glass panel subassembly is fabricated in parallel with the front glass panel subassembly. The pel electrodes and thin film transistors are deposited on the rear glass panel in an operation 108, followed by the deposit of an alignment film on the pel electrode/thin film transistor layer in an operation 110. The front and rear glass panel subassemblies are assembled in an operation 112, liquid crystal material is added in operation 114 and the thin film transistors are connected to driver electronics in an operation 116.

While there have been described what are considered to be preferred embodiments of the invention, variations and modifications therein will occur to those skilled in the art once they become aware of the basic inventive concepts. Therefore, it is intended that the appended claims shall be construed to include the preferred embodiments and all such variations and modifications as fall within the true spirit and scope of the invention.

What is claimed is:

1. In a liquid crystal display device of the type having front and rear glass panels, an array of thin film transistors with associated transparent pel electrodes, a transparent electrode layer and a liquid crystal material interposed between the pel electrodes and the transparent electrode layer, the improvement comprising a color filter layer in the form of a decal having appropriate color regions, said decal being affixed to a surface of one of said glass panels using known decal transfer methods, said surface being one facing the other of the glass panels.

2. An improved liquid crystal display device of the type defined in claim 1 wherein said color filter layer decal is interposed between the thin film transistors and the rear glass panel and provides a substrate upon which the thin film transistors and pel electrodes may be directly formed.

3. An improved liquid crystal display device of the type defined in claim 1 wherein said color filter layer decal is made of glass materials compatible with the temperatures required during the formation of the thin film transistors and pel electrodes.

4. An improved liquid crystal display device of the type defined in claim 1 wherein said color filter layer decal is interposed between the front glass panel and the transparent electrode layer.

5. An improved liquid crystal display device of the type defined in claim 4 wherein said color filter layer decal is made of glass material.

6. An improved method of fabricating a liquid crystal display device of the type having a front and rear glass panel, an array of thin film transistors with associate transparent pel electrodes, a transparent electrode layer and a liquid crystal material interposed between the pel electrodes and the transparent electrode layer, said method including the step of affixing a color filter decal layer to the surface of one of said glass panels using known decal transfer methods, said surface being one facing the other of the glass panels.

7. An improved method as defined in claim 6 wherein the color filter decal layer is made of glass materials and is affixed directly to a surface of the rear glass panel, said affixed decal layer providing a substrate upon which the thin film transistors and pel electrodes may be directly formed.

8. An improved method as defined in claim 7 wherein the color filter decal layer is made of glass material compatible with the temperatures which are required for the formation of the thin film transistors and pel electrodes.

9. An improved method as defined in claim 8 wherein said decal layer is transferred using thermal transfer.

* * * * *